(12) United States Patent
De Boer et al.

(10) Patent No.: US 6,334,947 B1
(45) Date of Patent: *Jan. 1, 2002

(54) CATALYST COMPRISING AT LEAST A HYDROGENATION METAL COMPONENT AND A SYNTHETIC CLAY AND A PROCESS OF USING

(75) Inventors: Mark De Boer, Amersfoort; Eelco Titus Carel Vogt, Utrecht; Robertus Gerardus Leliveld, Utrect; John Wilhelm Geus, Bilthoven; Roland Jacobus Martinus Josephus Vogels, Utrecht, all of (NL)

(73) Assignee: Akzo Nobel NV, Arnhem (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/793,438

(22) PCT Filed: Aug. 31, 1995

(86) PCT No.: PCT/EP95/03429

§ 371 Date: May 6, 1997

§ 102(e) Date: May 6, 1997

(87) PCT Pub. No.: WO96/07477

PCT Pub. Date: May 14, 1996

(30) Foreign Application Priority Data

Sep. 2, 1994 (NL) .............................. 9401431

(51) Int. Cl.⁷ .................... C10G 47/12; B01J 21/16
(52) U.S. Cl. ................. 208/111.25; 208/108; 208/109; 208/111.35; 208/111.3; 208/137; 208/138; 208/112; 502/84; 502/74; 502/80

(58) Field of Search .............................. 502/84, 74, 80; 208/108, 109, 111.35, 111.3, 137, 138, 112, 111.25

(56) References Cited

U.S. PATENT DOCUMENTS

| | | | |
|---|---|---|---|
| 4,375,406 A | * 3/1983 | Santilli | 208/251 H |
| 4,629,712 A | 12/1986 | Pinnavaia et al. | 502/63 |
| 4,637,991 A | 1/1987 | Battiste et al. | 502/68 |
| 4,637,992 A | 1/1987 | Lewis et al. | 502/84 |
| 4,665,044 A | * 5/1987 | Pinnavaia et al. | 502/84 |
| 4,766,099 A | 8/1988 | Dufresne et al. | 502/72 |
| 4,952,544 A | 8/1990 | McCauley | 502/68 |
| 5,023,221 A | * 6/1991 | Occelli | 502/66 |
| 5,076,907 A | * 12/1991 | Occelli | 208/111 |
| 5,328,590 A | * 7/1994 | Occelli | 208/111 |
| 5,413,977 A | * 5/1995 | Occelli | 502/68 |

FOREIGN PATENT DOCUMENTS

| | | | |
|---|---|---|---|
| GB | 2 063 699 | 6/1981 | B01J/2/16 |
| GB | 2 090 766 | 7/1982 | B01J/21/16 |
| GB | 2 091 120 | 7/1982 | B01J/21/16 |
| WO | WO 96/07613 | 3/1996 | C01B/33/40 |

* cited by examiner

Primary Examiner—Nadine Preisch
(74) Attorney, Agent, or Firm—Oliff & Berridge, PLC

(57) ABSTRACT

The invention pertains to a catalyst at least comprising a hydrogenation metal component and a swelling synthetic clay consisting of elemental clay platelets, with the average diameter of the clay platelets not exceeding 1 micron and the average degree of stacking of the clay platelets not exceeding 20 platelets per stack. The catalyst is especially suitable for the hydroprocessing of hydrocarbon feeds, the term "hydroprocessing" encompassing all processes in which a hydrocarbon feed is treated with hydrogen. The clays which are suitable for use in the catalyst according to the invention may be prepared as described in Netherlands patent application No. 9401433.

10 Claims, No Drawings

CATALYST COMPRISING AT LEAST A HYDROGENATION METAL COMPONENT AND A SYNTHETIC CLAY AND A PROCESS OF USING

The invention pertains to a catalyst at least comprising a hydrogenation metal component and a synthetic clay. Said catalyst is particularly suitable for hydroprocessing hydrocarbon feeds. The term "hydroprocessing" in this context encompasses all processes in which a hydrocarbon feed is reacted with hydrogen at elevated temperature and elevated pressure. These processes include hydrodesulphurisation, hydrodenitrogenation, hydrodemetallisation, hydrodearomatisation, hydro-isomerisation, hydrodewaxing, hydrocracking, and hydrocracking under mild pressure conditions, which is commonly referred to as mild hydrocracking.

Clays are layered silicates, also known as phyllosilicates. They are composed of a stack of elemental clay platelets. The individual clay platelets are composed of a central layer of octahedrally coordinated metal ions interlinked by means of oxygen ions. On either side of this octahedral layer there is a layer of tetrahedrally coordinated metal ions, with oxygen ions serving to link the tetrahedrally coordinated metal ions both to one another and to the octahedral layer. In addition to oxygen atoms interlinking metal ions, the clay structure contains hydroxyl groups.

To have a neutral octahedral layer, the metal ions present in that layer will have to provide a total charge of 6+ for every three octahedral cavities. This can be achieved by filling two out of every three octahedral cavities with trivalent metal ions, e.g., aluminium ions, or by filling all octahedral cavities of each set of three with divalent metal ions, e.g., magnesium ions. This gives two types of octahedral layers, viz. trioctahedral layers, which have three (divalent) cation site occupancy, and dioctahedral layers, which have two (trivalent) cation site occupancy. In dioctahedral layers one third of the octahedral sites between the oxygen atoms remains unfilled.

A neutral tetrahedral layer requires that the tetrahedral cation have a tetravalent charge. In general, the cation will be $Si^{4+}$.

When lower valency cations are substituted for higher valency cations in the clay platelet structure, the clay platelet is negatively charged. This phenomenon is known as isomorphous substitution. For instance, in the octahedral layer divalent metal ions such as magnesium, zinc or nickel may be substituted for trivalent metal ions such as aluminium. The clays formed in this fashion are called montmorillonites. Alternatively, in a trioctahedral layer monovalent metal ions such as lithium may be substituted for divalent metal ions, resulting in so-called hectorites. In the tetrahedral layer trivalent metal ions, e.g., aluminium atoms, may be substituted for the silicon atoms. In the case of a clay with a trioctahedral layer, such a substitution will give a saponite, for a clay with a dioctahedral layer the result will be a beidellite.

The negative charge generated by isomorphous substitution is counterbalanced by the incorporation of hydrated cations, also known as counter-ions, into the space between the clay platelets. Generally, these cations are incorporated in the hydrated form, causing the clay to swell. For this reason clays with negatively charged clay platelets are also known as swelling clays. It is because of this negative charge that swelling clays are advantageous for use in catalysts. For, they can act as solid acids.

The use of clays in hydroprocessing catalysts is known as such, e.g., from EP-A 0 246 906. In this publication hydroprocessing catalysts are described which contain a natural clay where hydrogenation metals have been substituted for the counter-ions.

GB 1 528 982 describes a hydroprocessing catalyst containing a Group VIB metal disulphide with a hexagonal crystal structure on a layered support, e.g., a clay.

However, the known clay-containing catalysts do not always provide satisfactory results when hydrocarbon feeds are reacted with hydrogen, int. al., because insufficient clay mineral is accessible to the feed and it is not possible to fully regulate the clays' properties.

The Catalyst According to the Invention

It has now been found that an exceptionally favourable hydroprocessing catalyst is obtained by the incorporation therein of a clay satisfying certain conditions with regard to the diameter and the degree of stacking of the clay platelets. The catalyst according to the invention at least comprises a hydrogenation metal component and a clay, with the average diameter of the clay platelets not exceeding 1 micron and the average degree of stacking of the clay platelets not exceeding 20 sheets per stack. The two parameters are easily determined by means of transmission electron microscopy. Furthermore, the clay platelets have to be negatively charged. Neutral clay platelets, i.e., clay platelets which have not been subject to isomorphous substitution, are catalytically inactive.

Because there are restrictions to the diameter and the degree of stacking of the clay platelets, their surface area is readily accessible to the feed, giving a very active catalyst.

The average diameter of the clay platelets is not more than 1 micron, and is preferably between 1 nm and 0.5 micron, more preferably in the range of 1 nm to 0.1 micron, most preferably in the range of 1 to 50 nm. The average degree of stacking of the clay platelets is not more than 20 platelets per stack, preferably not more than 10 platelets per stack, more preferably not more than 5 platelets per stack, and most preferably not more than 3 platelets per stack. The lower limit, needless to say, is constituted by unstacked clay platelets, which have a "degree of stacking" of 1. As regards isomorphous substitution, at least 0.1 atomic %, as compared with the neutral clay mineral of the cations, can be replaced by cations of a lower valency. Preferably, at least 1 atomic %, more preferably at least 5 atomic %, of the cations in the clay platelets is replaced by cations of a lower valency. In the octahedral layer, preferably not more than 50 atomic % of the metal ions is replaced by ions of a lower valency as compared with the neutral situation, more preferably not more than 30 atomic % is replaced. In the case of the tetrahedral layer, preferably not more than 30 atomic % of the tetravalent metal ions present is replaced by metal ions of a lower valency, more preferably not more than 15 atomic %. Isomorphous substitution may occur only in the octahedral layer, only in the tetrahedral layer, or in both layers. In this context the term isomorphous substitution also refers to the removal of cations without the incorporation into the lattice of replacement cations, by which vacancies are produced. It will be clear that this removal also generates negative charges.

The trivalent ions in the octahedral layer preferably are aluminium, chromium, cobalt (III), iron (III), manganese (III), titanium (III), gallium, vanadium, molybdenum, tungsten, indium, rhodium, and/or scandium. The divalent ions in the octahedral layer preferably are magnesium, zinc, nickel, cobalt (II), iron (II), manganese (II), copper (II) and/or beryllium, and the monovalent ions preferably are lithium ions.

The tetravalent ions in the tetrahedral layer preferably are silicon, titanium (IV), and/or germanium, for which may be substituted trivalent ions preferably selected from aluminium, borium, gallium, chromium, iron (III), cobalt (III), and/or manganese (III). A portion of the hydroxyl groups present in the clay platelets may be replaced by fluorine if so desired.

Clays suitable for use in the catalyst according to the invention include clays with a composition as given in the following table:

| Octahedral layer | Tetrahedral layers |
|---|---|
| Al, Mg | Si |
| Al, Mg, | Si, Al |
| Mg | Si, Al |
| Al, Ni | Si |
| Mg, Li | Si |
| Mg, Ni | Si, Al |
| Al, Mo | Si, Al |
| Al, Co | Si |
| Al, Co | Si, Al |
| Co | Si, Al |
| Co, Li | Si |
| Mg, Co | Si, Al |

As was stated earlier, it is of vital importance to the catalyst according to the invention that the clay platelets be negatively charged. This can be effected simply by ensuring that metal ions of a lower valency than is required for the neutral state are incorporated into the octahedral layer or the tetrahedral layer or both. In the catalyst according to the invention use can be made of clays which have had isomorphous substitution in the octahedral layer as well as clays which have had isomorphous substitution in the tetrahedral layer. Since the negative charge is closer to the surface of the clay platelets in the case of substitution in the tetrahedral layer, substitution in the tetrahedral layer will generally give more strongly acid sites than substitution in the octahedral layer. Isomorphous substitution in the tetrahedral layer gives a structure of acid sites which somewhat resembles the acid sites structure found in zeolites.

Optionally, the counter-ions in the interlayer between the clay platelets can be replaced by $H_3O^+$ ions. Generally, such a substitution does not involve suspending the clay in a concentrated acid, for the acid may react with the cations in the clay structure, resulting in the cations being lixiviated and ending up in the interlayer. If it is desired to introduce $H_3O^+$ ions into the interlayer between clay platelets, the first step is to use ion exchange to incorporate hydrolysing metal ions into the interlayer. Hydrolysis will then give hydrogen ions. These Brønsted acid sites can be converted into Lewis acid sites by heating. Alternatively, Brønsted sites can be achieved by substituting ammonium ions for cations and then heating the whole. This process will result first of all in ammonia desorption, leaving a proton to form a Brønsted site. Heating to a higher temperature results in water desorption, forming a Lewis site. Such Lewis sites are of particular interest for catalytic purposes.

Swelling clays suitable for use in the catalyst according to the invention are disclosed, int. al., in Netherlands patent application No. 9401433.

In this patent application clays are described which have clay platelets satisfying the requirements as to degree of stacking and size of the platelets, thus rendering them suitable for use in the catalyst according to the invention. This patent application further describes clay minerals composed of clay platelets of the desired degree of stacking and sheet size where the clay platelets are not so much stacked as placed one on top of the other at an angle in a "house of cards" structure. The advantage of this house of cards structure is that it gives comparatively wide pores of a diameter of the order of 6 nm and higher. The greater part of the specific surface area of such a clay is in pores having a diameter of 6 nm or higher. A feature of such a structure is that its X-ray diffraction pattern has no or hardly any (001) reflections, indicating that there is hardly any stacking.

The aforesaid patent application also describes a process for the preparation of clays suitable for use in the catalyst according to the present invention, which process has the advantage over the conventional processes of forming clays having the desired properties in regard of the size and the degree of stacking of the clay platelets. In addition, compared with the known processes the implementation and scaling up of said process are particularly simple.

In the broadest form, the implementation of the process described in said patent application is as follows. An aqueous mixture of the components needed to achieve synthesis, viz. oxides of the tetravalent ions to be incorporated into the tetrahedral layer and the ions to be incorporated into the octahedral layer, is brought to a pH in the range of 3 to 9. The whole is then aged for some time, e.g., for 0,5 to 50 hours, at a temperature in the range of 600 to 350° C., the pH being kept at the desired value. In this process a solid product is formed, which is isolated, for instance by filtration, and, if so desired, washed and/or subjected to an ion exchange prior to being dried. The process preferably is carried out in the absence of chloride.

One possible way of implementing the process is by mixing the starting products prior to the preparation and then rapidly bringing the whole to the pH at which the clay is to be formed. During the subsequent heating the pH is kept at this value, with stirring, by the addition of a base. This may take the form of a base being injected below the surface of the liquid, or of adding a compound which will decompose to form a base.

It is preferred, however, to prepare a suspension containing solid silica and metal ions to be incorporated into the octahedral layer, and to slowly increase the pH of this slurry by the addition of a base or the partial decomposition of a base precursor. For example, a silica gel is prepared, the pH of which is reduced to a value at which the metal ions to be incorporated into the octahedral layer are still soluble. Next, the metal ions to be incorporated into the octahedral layer are added. Excess urea is added, and the whole is aged with stirring. Base is released by the decomposition of the urea, resulting in a slow increase in the pH of the suspension to form a clay mineral. The nature of the obtained clay can be altered by varying the nature of the metal ions added. For instance, adding a mixture of magnesium ions and zinc ions will give a clay of which the octahedral layer contains both magnesium ions and zinc ions.

The size of the clay platelets is dependent on the aging temperature and the aging period. The higher the aging temperature is and the longer the aging period, the larger the clay platelets will be. The size is also dependent on the nature of the metal ions to be incorporated into the octahedral layer. If, say, zinc ions are used, the platelets obtained will be much larger than when magnesium ions are used.

The degree of stacking is dependent on the ionic strength of the solution. A high ionic strength will give much-stacked structures, while a low ionic strength will lead to structures exhibiting little stacking.

A simple way of preparing a clay in which aluminium is substituted for silicon in the octahedral layer is by treating silica with a basic aluminate solution, acidifying the whole to a pH at which the metal ions to be incorporated into the octahedral layer are still soluble, adding these metal ions, and then homogeneously increasing the pH of the solution. Preference is given in this process to a gel prepared by adding a basic aluminate to a silica gel. Following acidification the metal ions to be incorporated into the octahedral layer and an overmeasure of a compound which decomposes to form a base, e.g., urea, are added to homogeneously increase the pH. Next, the whole is aged with stirring, in which process the insoluble clay mineral is formed. This process produces clay minerals which satisfy the average platelet diameter and degree of stacking requirements set for use of the clay in the catalyst according to the invention. The ratio of silicon atoms to aluminium atoms in the tetrahedral layer, and hence part of the acidity of the clay, can be regulated through the ratio of silicon ions to aluminium ions in the gel. The gel's silicon atoms and aluminium atoms by and large end up in the tetrahedral layer of the formed clay.

If so desired, the clays may be pillared. This involves providing oligomers or polymers of, say, aluminium, chromium, zirconium or titanium hydrated by ion exchange between the clay platelets. One example of a known compound used to provide pillars is the aluminium-13 cluster, a complex of 13 aluminium ions interlinked by hydroxyl groups and oxygen atoms. The incorporation of pillars between the clay platelets ensures that the space between the clay platelets is kept open during drying, thus increasing the accessible surface area. Processes for providing pillars between clay platelets include those described in U.S. Pat. Nos. 4,952,544, 4,637,991, and 4,766,099. The invention further pertains to a catalyst containing a hydrogenation metal component and a pillared clay.

In Netherlands patent application No. 9401433 a process for producing pillars is described where the pH of a solution of the metal ions which are to form the pillars is slowly increased, e.g., using urea. This process makes it possible to produce larger pillars than those known so far. This is done, for instance, by preparing an aluminium solution having a low pH, which pH is then increased in a controlled manner. This first results in the forming of aluminium-13 complexes. If the pH is increased still further, aluminium will precipitate on the aluminium-13 complexes, resulting in larger aluminium complexes. These can be incorporated between the clay platelets by means of ion exchange. Catalysts containing a hydrogenation metal component and pillared clay minerals as described in the aforementioned patent application are also part of the present invention. Apart from that, it should be noted that because the clay minerals used in the catalyst according to the invention have such small clay platelets and a low degree of stacking, rendering the surface area of the clay platelets readily accessible, it is not necessary by any means to always pillar the clay.

Netherlands patent application No. 9401433 also discloses the use of activated carbon, e.g., in the form of carbon filaments, as support material for the clay. This embodiment is of interest to hydroprocessing applications, and the present invention encompasses a hydroprocessing catalyst containing a hydrogenation metal component and a clay on a support of activated carbon as one of its embodiments.

The clays used in the catalyst according to the present invention generally have a specific surface area in the range of 100 to 1000 m²/g, depending on the nature of the metals present in the octahedral layer. The pore volume, determined by means of nitrogen sorption, is in the range of 0.03 to 1.5 ml/g, again depending on the nature of the metals present in the octahedral layer. In general, the catalyst according to the invention contains 1 to 99 wt.% of clay.

The catalyst according to the invention at least comprises a hydrogenation metal component. As will be evident to the skilled person, the word "component" in this context denotes the metallic form of the metal, its oxide form, or its sulphide form, or any intermediate, depending on the situation. The hydrogenation metals are selected from the Periodic Table's Group VIB and Group VIII metals. The nature of the hydrogenation metal present in the catalyst is dependent on the catalyst's envisaged application. If, say, the catalyst is to be used for hydrogenating aromatics in hydrocarbon feeds, the hydrogenation metal used preferably will be one or more noble metals of Group VIII, preferably platinum, palladium, or a mixture thereof. In this case the Group VIII noble metal preferably is present in an amount of 0.05–5 wt. %, more preferably in an amount of 0.1 to 2 wt. %, calculated as metal. If the catalyst is to be used for removing sulphur and/or nitrogen, it will generally contain a Group VIB metal component combined with a Group VIII metal component. In that case, preference can be given to the combination of molybdenum, tungsten, or a mixture thereof and nickel, cobalt, or a mixture thereof. The Group VIB hydrogenation metal preferably is present in an amount of 2 to 40 wt. %, more preferably in an amount of 5 to 30 wt. %, most preferably in an amount of 5 to 25 wt. %, calculated as trioxide. The Group VIII non-noble hydrogenation metal preferably is present in an amount of 1 to 10 wt. %, more preferably in an amount of 2–8 wt. %, calculated as oxide. If the catalyst is to be used in hydrocracking or mild hydrocracking, use will be made of either a Group VIII noble metal or a combination of a Group VIB metal and a Group VIII metal.

Clays possess a remarkable property as compared with well-known acidic components such as silica-alumina and zeolites in that they enable the hydrogenation metals as described above to be incorporated into the clay platelet structure. For instance, cobalt or nickel may be present in the octahedral layer. In order to be catalytically active, these metals must be removed from the clay platelet structure during catalyst use. This can be done, e.g., by means of reduction or sulphidation, for instance when the catalyst is sulphided under reducing conditions prior to use. Alternatively, the hydrogenation metals can be incorporated into the interlayer between the clay platelets through ion exchange.

In addition to the clay satisfying the aforementioned conditions with regard to clay platelet size and maximum number of clay platelets in a stack, the catalyst may comprise matrix materials, e.g., alumina, silica, silica-alumina, silica-magnesia, zirconia, titania, silica-zirconia, silica-titania, other clays, molecular sieves, aluminophosphates, and mixtures of these materials. These matrix materials can function as binder for the clay platelets, thus improving the attrition resistance of the catalyst particles. They can also function as filler material, acting as diluent of the cracking activity of the clay platelets, thus making it possible to regulate the cracking activity of the catalyst. On the other hand, these matrix materials can also add a catalytic activity of their own to the catalyst according to the invention. For example, the incorporation of silica-alumina or a molecular sieve component into the catalyst composition will add a specific cracking activity to the catalyst composition.

The amount of matrix material which is present in the catalyst composition according to the invention will depend on its function. Preferably, the catalyst according to the invention contains at least 5 wt. % of matrix material, calculated on the weight of the catalyst composition. Binder/filler matrix materials are generally present in an amount of 0–90 wt. %, calculated on the weight of the catalyst composition. For example, catalysts are envisaged containing 10–50 wt. % of clay component, 1–45 wt. % of hydrogenation metal component, and the balance, that is, 89–50 wt. %, of binder/filler. Suitable binder/filler matrix materials are, for example, alumina, silica, titania, and zirconia, with alumina generally being especially suitable. The amount of matrix materials with catalytic cracking activity will depend upon the activity desired. If these types of catalytically active matrix materials are present, they are preferably present in an amount of 10–80 wt. %, calculated on the weight of the catalyst composition, more preferably in an amount of 20–50 wt. %. Of course catalysts comprising two types of matrix material are also envisaged in the present invention.

Optionally, the catalyst can further contain other components such as phosphorus. It will be obvious to the skilled person that phosphorus can be incorporated into the catalyst in a suitable manner by contacting the catalyst during any one of its formative stages with an appropriate quantity of a phosphorus-containing compound, e.g., phosphoric acid. For instance, the catalyst can be impregnated with an impregnating solution comprising phosphorus in addition to any other components. If the catalyst according to the invention contains phosphorus, this compound is preferably present in an amount of 0.5–10 wt. %, calculated as $P_2O_5$, based on the weight of the catalyst composition.

The catalyst according to the invention generally has a specific surface area in the range of 50 to 600 $m^2/g$, preferably in the range of 100 to 400 $m^2/g$, and a pore volume in the range of 0.1 to 1.5 ml/g, preferably in the range of 0.3 to 1.2 ml/g.

Preparation of the Catalyst According to the Invention

The catalyst according to the invention can be prepared in several ways.

For instance, it is possible to extrude the clay into particles, calcine the extrudates, and impregnate the calcined extrudates with an impregnating solution containing salts of the hydrogenation metals to be introduced, optionally in combination with other components such as phosphoric acid and/or complexing agents known in the art. Alternatively, the clay can be mixed with other support materials which, as explained above, may have their own catalytic activity, whereupon this mixture can be extruded and the resulting extrudates calcined. The calcined extrudates can then be impregnated as described above. It is also possible to add certain hydrogenation metal components to the catalyst composition prior to extrusion, more particularly, it is proposed to mix the clay and any other support materials with molybdenum oxide, after which the resulting mixture is extruded and calcined.

As was stated earlier, clays containing hydrogenation metals of their own can also be used in the catalyst according to the invention. The hydrogenation metals can be added, e.g., during the preparation of the clay, resulting in their incorporation into the octahedral layer. While it may be that the catalyst contains only those hydrogenation metals introduced via the clay, it is also possible to incorporate other, additional hydrogenation metals into the catalyst composition. Furthermore, the hydrogenation metals can be incorporated as counter-ions between the clay platelets, to counterbalance the clay platelets' negative charge.

It will be evident to the skilled person that it is also possible to combine the different aspects of the processes described above. Thus, a portion of the hydrogenation metals can be introduced via impregnation, while another portion is mixed with the clay before it is formed into a support, or a portion of the hydrogenation metals is incorporated into the catalyst composition by way of the clay component, while another portion is added to the catalyst composition by impregnation of the shaped support.

The catalyst particles may have many different shapes. The suitable shapes include spheres, cylinders, rings, and symmetric or asymmetric polylobes, for instance tri- and quadrulobes. The particles usually have a diameter in the range of 0.5 to 10 mm, and their length likewise is in the range of 0.5 to 10 mm.

If the catalyst contains non-noble Group VIII metals and/or Group VIB metals as hydrogenation metals, it is preferably sulphided prior to use. This involves converting the metal components in the catalyst to their sulphided form. The sulphiding can be done by means of processes known to the skilled person, e.g., by contacting the catalyst in the reactor at rising temperature with hydrogen and a sulphurous feed, or with a mixture of hydrogen and hydrogen sulphide. If the catalyst is a Group VIII noble metal, there is no need for sulphiding as a rule, and a reducing step, e.g., with hydrogen, will suffice.

As stated before, if the clay component contains hydrogenation metals such as cobalt or nickel, these will be freed from the clay by sulphidation. Because the hydrogenation metals are distibuted homogeneously through the clay, the hydrogenation metals will be distributed homogeneously over the catalyst composition after sulphidation.

Use of the Catalyst According to the Invention

Depending on their composition, the catalysts according to the invention can be used in virtually all hydroprocessing processes to treat a plurality of feeds under wide-ranging reaction conditions, e.g., at temperatures in the range of 200° to 440° C., hydrogen pressures in the range of 5 to 300 bar, and space velocities (LHSV) in the range of 0.05 to 10 $h^{-1}$.

For example, certain catalysts according to the invention are suitable for use in the hydrocracking of heavy feedstocks to form middle distillates. For these hydrocracking processes, the following values for the relevant process parameters apply:

temperature: in the range of 2300 to 450° C.;

hydrogen pressure: in the range of 100 to 250 bar;

space velocity: in the range of 0.2 to 3 $hours^{-1}$;

$H_2$/oil ratio: in the range of 300 to 2000 Nl/l.

Generally, the conditions selected are such as will give a conversion of at least 70 wt. %. The term conversion in this context refers to the weight, in per cent, of obtained product with a boiling point below 391° C. (where applicable, this weight is corrected by taking into account the weight of the portion of the feedstock which already boils below 391° C.) vis-à-vis the weight of the feedstock deployed. An example of a catalyst according to the invention which is suitable for use in hydrocracking to produce middle distillates is a catalyst comprising 3–40 wt. % of hydrogenation metals, preferably comprised of a combination of Ni and Mo or W, 1–60 wt. % of clay component, preferably 10–50 wt. %, 3–55 wt. % of zeolite, preferably 10–50 wt. %, and the balance alumina.

An example of a catalyst according to the invention which is suitable for the production of diesel by way of hydrocracking comprises a Group VIB hydrogenation metal component, a non-noble Group VIII hydrogenation metal component, and two crystalline acid components, namely a clay component with the required properties as to platelet size and stacking degree in combination with a Y-zeolite with a unit cell size in the range of 2.400–2.480 nm. The clay component is for example a magnesium saponite.

The use of the catalysts according to the invention in mild hydrocracking processes is also envisaged. For mild hydrocracking processes, the following values hold for the relevant process parameters:

temperature: in the range of 350° to 450° C.;

hydrogen pressure: in the range of 25 to 100 bar, preferably in the range of 40 to 80 bar;

space velocity: in the range of 0,2 to 3 hours$^{-1}$;

$H_2$/oil ratio: in the range of 200 to 1000 Nl/l.

Generally, the conditions selected are such as will give a conversion of at least 20 wt. %. The definition of conversion is the same as that given above.

An example of a catalyst according to the invention which is suitable for use in mild hydrocracking to produce middle distillates is a catalyst comprising 3–40 wt. %, preferably 10–40 wt. %, of hydrogenation metal components, which preferably are a combination of Ni and Mo or W, 5–75 w t.% of a clay component, preferably 15–50 wt. %, and 0–95 wt. %, preferably 5–50 wt. %, of alumina binder.

The catalysts according to the present invention a re also very suitable for use in hydroisomerisation, more particularly for the difunctional hydroisomerisation of long chain paraffins. These long chain paraffins, also known as waxes, are molecules that have a negative effect on the quality of diesel fuels and lube oils. In diesel fuels, the wax molecules tend to crystallise at unacceptably high temperatures, so rendering the diesel unsuitable for fuel applications during wintertime. In lube oils, waxes will mainly affect the viscosity. Hence, these molecules must be removed. Two ways to achieve this are known in the literature, namely cracking the molecules to lower boiling molecules and isomerisation of the molecules to isoparaffins. A (hydro)cracking dewaxing catalyst will by nature convert some of the feedstock, namely the n-paraffins, to products outside the desired boiling range, thus limiting the attainable yields of middle distillate. A hydroisomerisation process, on the other hand, will convert the n-paraffins to isoparaffins, which have boiling points in the desired range but melting/crystallisation points (i.e., cloud points) much lower than those of the n-paraffins. It has been found that the catalyst according to the invention is also suitable for use in the hydroisomerisation of wax-containing feedstocks. Such a catalyst contains a hydrogenation component consisting of one or more of Group VIB metal components and Group VIII metal components, more particularly, the Group VIII noble metals. Most preferably, the hydrogenation component is platinum, palladium, or a combination of the two. The presence of the clay component in the catalyst according to the invention is advantageous for the hydroisomerisation of wax-containing feedstocks, because it has a combination of desirable properties. The low acidity of the clay precludes hydrocracking of the product isoparaffins. The properties of the clay are such that a good dispersion of the hydrogenation component is ensured. The effects of mass diffusion limitation are eliminated by controlling the properties of the support. It is preferred in this specific application to prevent hydrocracking through binder-support interactions by using a binder material which does not give rise to such interactions, e.g., silica or titania.

Alternatively, it may be preferable to shape the synthetic acid saponite support without any binder whatsoever. A particularly preferred catalyst for use in hydroisomerisation is a catalyst comprising 0.1–2.0 wt. % of platinum, palladium, or a mixture thereof, 1–99.9 w t.%, preferably 10–50 wt. %, of clay component, and 0–98.9 wt. %, preferably 50–90 wt. %, of silica, titania, or a mixture thereof.

The present invention is illustrated by the following Examples.

EXAMPLE 1

Preparation of Mg-, Zn-, Co-, and Ni-clays Having a Si/Al Ratio of 39 and 12.3

To prepare a Si/Al gel having a Si/Al ratio of 12.3, 100 ml of demineralised water we re added to 43.6 g of water glass (about 27 wt. % silica) in a 250 ml beaker. To this was added, after vigorous stirring, a solution of 5.95 g of Al $(NO_3)_3$ 9 $H_2O$ in 80 ml of 2 M caustic soda. To obtain a Si/Al gel having a Si/Al ratio of 39, 2.30 g of Al$(NO_3)_3$ 9 $H_2O$ in 88.5 ml of 65% nitric acid were added to a solution of 43.6 g of water glass (about 27 wt. % silica ) in 100 ml of demineralised water. The prepared gels were cured for one hour at room temperature.

Next, the gel having the desired Si/Al ratio was transferred to a precipitation vessel as specified by Van Dillen et al. (A. J. van Dillen, J. W. Geus, L. A. M. Hermans, J. van der Meyden, *Proc.* 6th Int. Conf. on Cat. 11, 5 (1977)) and suspended in 1.8 l of demineralised water. The suspension was heated to 90° C., whereupon 36 g of urea and the desired amount of Mg-, Zn-, Co- or Ni-nitrate were added. This was 0.16 mole and 0.185 mole, respectively, for the gels having a Si/Al ratio of 12.3 and 39. After 20 hours of stirring at 90° C. the suspension was filtered, followed by the residue being washed with 500 ml of demineralised water and filtered three times. The resulting clay was dried at 120° C. for 16 hours and calcined in air at 450° C. for 16 hours.

EXAMPLE 2

Preparation of 7.5 wt. % $MoO_3$/clay Catalyst Via Impregnation

To 10 g of ground up clay (sieve fraction 150–425 μm) prepared as described in Example 1 there was added, in vacuo (water jet air pump) in a 100 ml round-bottomed flask, a solution of 0.99 g of $(NH_4)Mo_7O_{24}$ 6 $H_2O$ in demineralised water. The amount of water used was equal to the pore volume of the clay as determined by nitrogen adsorption. After adsorption of the solution into the evacuated clay for 5 minutes the catalyst was dried in a flow of air (5 l/min) for 3 hours with the round-bottomed flask being rotated. Next, there was 16 hours of drying at 120° C. and 16 hours of calcining in air at 450° C.

EXAMPLE 3

Preparation of 7.5 wt. % $MoO_3$/clay Catalyst Via Homogeneous Deposition Precipitation An aqueous Mo(III) solution was prepared by electrochemical route. Platinum electrodes were employed as cathode and anode (9 $cm^2$). The anode space was a porous porselain pot (200 ml) filled with 8 M hydrochloric acid. This pot was placed in a 1000 ml beaker filled with a solution of 17.2 g of $(NH_4)MO_7O_{24}$ 6 $H_2O$ in 650 ml of 8 M hydrochloric acid. Stirring was by means of a magnetic agitator. For 8 hours current was passed through (3.8 V, anodic current density 0.003 A/$cm^2$), until a clear, light red Mo(III) solution was obtained.

The clay as described in Example 1 after being washed and filtered was introduced into the precipitation vessel from Example 1 and suspended in 1.8 l of demineralised water. Unlike in earlier examples, the Mg-clay Si/Al=39 and Zn-clay Si/Al=12.3 from Example 1 were dried and calcined before being suspended in water. Nitrogen gas was passed through the suspension via a gas inlet pipe. In about 4 hours' time 80 ml of the Mo(III) solution from Example 3 was pumped into the suspension with a fluid pump. At the same time, the pH was kept constant at 6.5 by injection of 5% ammonia. Next, the suspension was filtered and washed, after which the residue was dried at 120° C. for 16 hours. Calcination took place in air at 450° C. over a period of 16 hours.

EXAMPLE 4

Synthesis of Clays of the Overall Formula $M_{6-x}Z_xSi_8O_{20}(OH_4)$, wherein Z=Co or Ni To a solution of 93.8 g of water glass (about 27 wt. % silica) in 200 ml of demineralised water was added a solution of 16 ml of 65% nitric acid in 160 ml of demineralised water. The gel formed after stirring was cured for one hour at room temperature and then transferred to a precipitation vessel such as described in Example 1. The gel was diluted with 2 l of demineralised water and heated to 90° C. For the synthesis of $Mg_3Co_3Si_8O_{20}(OH_4)$ were added 40.5 g of $Mg(NO_3)_3$ 6 $H_2O$ 98.0 g of $Co(NO_3)_3$ 6 $H_2O$. The ratio of Co and Ni to Mg for the various syntheses ranged from 100% Co or Ni to 100% Mg. After the addition of 72.0 g of urea there was stirring at 90° C. for 20 hours. The suspension was alternately filtered and washed with 700 ml of demineralised water three times in succession. The product was dried at 120° C. for 16 hours and calcined in air at 450° C. for 16 hours.

EXAMPLE 5

Desulphurisation of Thiophene by Mo/clay Catalysts at Atmospheric Pressure

To test the activity of the catalysts of Examples 1, 2, 3, and 4 in thiophene ($C_4H_4S$) hydrodesulphurisation, use was made of an automated microflow set-up. To this end 1.0 ml of the catalyst was loaded on a quartz lattice in a quartz lab reactor (inner diameter 8 mm). On top of the catalyst bed was placed 1 ml of quartz beads (1.5 mm in diameter), after which the reactor was placed in an oven. The temperature was measured with a thermocouple stuck into the catalyst bed.

In order to activate the catalyst it was sulphided with a gas stream comprising 100 ml/min $H_2/H_2S$/Ar (10/40/50). To this end the gas mixture was passed over the catalyst for 30 minutes at room temperature, after which the catalyst was heated to 400° C. (5° C./min). After 30 minutes at 400° C. the gas flow was changed to 51.2 ml/min of thiophene/$H_2$/Ar (2.4/87.9/9.7). Measuring was carried out under atmospheric pressure. The reaction products 1-butene, cis-butene, trans-butene, isobutane, butane, $H_2S$, and unconverted thiophene were analysed with the aid of a gas chromatographer with a Chrompack CP-sil-5 CB column integrated in the flow system (0.53 mm, df=2.0 $\mu$m, 100 m, 30° C., carrier gas He). The table below lists the conversion after 6 hours of reaction at 400° C. for the various (Mo) clays. The conversion is defined as the percentage calculated by dividing the number of moles of reaction products by the overall number of moles of reaction products and the unconverted thiophene. The selectivity to a certain product is defined as the percentage calculated from the number of moles of said product divided by the total number of moles of product obtained. It is clearly shown that without Mo the Co- and Ni-clays are also active in the hydrodesulphurisation of thiophene.

TABLE 1

Conversion (%) after 6 hours of hydrodesulphurisation at 400° C.

| | | | HDS Conversion. (%) (400° C.) | | |
|---|---|---|---|---|---|
| Clay | Ion | Si/Al ratio | blank | Mo impr. | Mo dep. precipit. |
| 1 | Zn | 39 | 0.2 | 0.4 | 4.0 |
| 2 | Zn | 12.3 | 0.1 | 0.3 | 0.6 |
| 3 | Mg | 39 | 0.2 | 20.2 | 2.7 |
| 4 | Mg | 12.3 | 0.06 | 20.7 | 13.4 |

TABLE 1-continued

Conversion (%) after 6 hours of hydrodesulphurisation at 400° C.

| | | | HDS Conversion. (%) (400° C.) | | |
|---|---|---|---|---|---|
| Clay | Ion | Si/Al ratio | blank | Mo impr. | Mo dep. precipit. |
| 5 | Co | 39 | 90.8 | 86.2 | 61.3 |
| 6 | Co | 12.3 | 42 | 19.7 | 21.4 |
| 7 | Ni | 39 | 70.1 | 82.6 | 81.7 |
| 8 | Ni | 12.3 | 77.0 | 82.3 | 67.3 |

Tables 2 and 3 list the selectivity to the various products of the "blank" clays without Mo and the Mo-impregnated clays. The catalysts where the Mo is provided on the clay via homogeneous deposition precipitation have the same selectivity pattern as the impregnated clays. The formation of isobutane from unbranched $C_4$ hydrocarbons indicates the presence of acid sites on the catalyst.

TABLE 2

Selectivity (%) to the various products of the clays on which no Mo is provided in HDS reaction at 400° C.

| | | | HDS Selectivity (%) | | | | |
|---|---|---|---|---|---|---|---|
| Clay | Ion | Si/Al | 1-butene | cis-butene | trans-butene | butane | isobutane |
| 5 | Co | 39 | 20.1 | 17.1 | 24.2 | 29.7 | 8.9 |
| 6 | Co | 12.3 | 20.6 | 20.8 | 30.0 | 20.0 | 8.6 |
| 7 | Ni | 39 | 37.4 | 21.3 | 29.9 | 7.5 | 3.9 |
| 8 | Ni | 12.3 | 37.6 | 20.7 | 29.4 | 7.1 | 5.2 |

TABLE 3

Selectivity (%) to the various products of 7.5 wt. % $MoO_3$/clay (impregnated) in HDS reaction at 400° C.

| | | | HDS Selectivity (%) | | | | |
|---|---|---|---|---|---|---|---|
| Clay | Ion | Si/Al | 1-butene | cis-butene | trans-butene | butane | isobutane |
| 3 | Mg | 39 | 22.8 | 24.7 | 34.8 | 16.6 | 1.1 |
| 4 | Mg | 12.3 | 20.5 | 24.0 | 34.2 | 20.8 | 0.5 |
| 5 | Co | 39 | 19.8 | 17.3 | 24.6 | 29.9 | 8.4 |
| 6 | Co | 12.3 | 21.2 | 21.6 | 32.2 | 17.2 | 7.8 |
| 7 | Ni | 39 | 32.0 | 20.4 | 28.6 | 13.9 | 5.1 |
| 8 | Ni | 12.3 | 33.6 | 20.0 | 28.2 | 12.4 | 5.8 |

EXAMPLE 6

Desulphurisation of Thiophene by Catalysts of the Overall Formula $Mg_{6-x}Z_xSi_8O_{20}(OH)_4$, wherein Z=Co or Ni, at Atmospheric Pressure The experimental conditions and the manner in which these catalysts were activated for testing are described in Example 5. The table below lists the conversion and the selectivity to the various products of the different catalysts after 6 hours' reaction at 400° C.

TABLE 4

Conversion (%) and selectivity (%) to the various products of $Mg_{6-x}Z_xSi_8O_{20}(OH)_4$, wherein Z = Co, in HDS reaction at 400° C.

| | | Conv. | HDS Selectivity (%) | | | | |
|---|---|---|---|---|---|---|---|
| Co | Mg | (%) | 1-butene | cis-butene | trans-butene | butane | isobutane |
| 0.2 | 5.8 | 20.8 | 25.8 | 30.0 | 42.3 | 1.9 | 0 |
| 1.0 | 5.0 | 59.4 | 23.0 | 28.2 | 39.9 | 8.9 | 0 |
| 3.0 | 3.0 | 88.6 | 19.4 | 23.2 | 33.0 | 23.9 | 0.5 |
| 6.0 | 0 | 97.4 | 17.5 | 19.8 | 28.0 | 32.8 | 1.9 |

TABLE 5

Conversion (%) and selectivity (%) to the various products of $Mg_{6-x}Z_xSi_8O_{20}(OH)_4$, wherein Z = Ni, in HDS reaction at 400° C.

| | | Conv. | HDS Selectivity (%) | | | | |
|---|---|---|---|---|---|---|---|
| Ni | Mg | (%) | 1-butene | cis-butene | trans-butene | butane | isobutane |
| 0.2 | 5.8 | 11.1 | 25.1 | 30.0 | 43.4 | 1.5 | 0 |
| 1.0 | 5.0 | 16.4 | 24.9 | 30.3 | 43.0 | 1.8 | 0 |
| 3.0 | 3.0 | 48.3 | 24.4 | 29.0 | 41.0 | 5.6 | 0 |
| 6.0 | 0 | 36.6 | 24.3 | 29.3 | 41.6 | 4.8 | 0 |

EXAMPLE 7
Hydrocracking Catalysts Based on Synthetic Acid Saponite Clay

A magnesium saponite according to the invention was prepared as follows: Solution A was prepared by adding 1064 g of water glass (27.7% $SiO_2$, 8.5% $Na_2O$) to 2680 g of water. Solution B was prepared by adding 317 g of $Al(NO_3)_3 \cdot 9H_2O$ (Baker) to 2120 g of 2N NaOH. Solution B was added to solution A in about 20 minutes. The pH of the resulting viscous mixture was 11.8. After the addition of solution B the reaction vessel was heated to 90° C. in about 1 hour. After heating, the viscosity of the mixture decreased considerably. Solution C was prepared by mixing 1921 g of urea (Baker), 1084 g of $Mg(NO_3)_2$ (Baker), and 2500 g of water. Solution C was added to the reaction mixture in 20 minutes. The resulting pH was 7.08. After this addition, the temperature was adjusted to 90° C., and the volume was corrected for evaporation losses. The mixture was kept at 90° C. for 20 hours, after which the pH was found to be 6.85.

The product was filtered off and reslurried in 4 l of water of 80° C. The product was stirred for 45 minutes at 80° C. and then filtered off, after which it was reslurried and immediately filtered off twice with 5 l of hot water. The filter cake (1080 g) was dried overnight at 120° C., after which 557 g of synthetic saponite were collected. The LOI was 15.3%, the $Al_2O_3$ content 8.6 wt% dry base (db), the $SiO_2$ 56.1 wt% db, the MgO 30.7 wt % db, and the $Na_2O$ 1.9 wt % db. The pore volume measured by nitrogen desorption was 0.546 ml/g, the mean pore diameter was 6.2 nm, and the SABET was 552 m2/g.

Two different catalysts materials were prepared with this material.

Catalyst A

Support A was prepared by mixing 218 g of pseudoboehmite alumina (LOI 24%) with sufficient dilute $HNO_3$ to peptise part of the alumina and mixed for 15 minutes, after which 159 g of the synthetic saponite prepared above were added to the mixture. Some additional water was added, and the resulting mixture was kneaded for 40 minutes. The paste was then extruded to form 1.5 mm cylindrical extrudates, which were dried at 120° C. overnight and subsequently calcined in air at 450° C. for one hour. The water PV of the extrudates was 1.0 ml/gram. The PV as measured by mercury intrusion was 0.88 ml/gram, with an MPD of 18.3 nm. 190.31 g of support A (LOI 7%, PV $H_2O$ 1.0 ml/g) were impregnated with an impregnation solution of $Co(NO_3)_2$ and $(NH_4)Mo_2O_7$ in water with a pH of 3. The catalyst was dried at 120° C. for 1.5 hours and subsequently calcined. The sample was slowly heated to 420° C. and kept at that temperature for three hours in air. The metal contents of the final catalyst were 11.5 wt % $MoO_3$ and 3.2 wt % CoO.

The pore size distribution of the final catalyst was as follows:

| Hg autopore |
|---|
| MPD = 20.0 nm |
| PV > 2.1 nm = 0.737 ml/g |
| > 5.0 nm = 0.547 ml/g |
| > 10 nm = 0.373 ml/g |
| > 20 nm = 0.253 ml/g |

Catalyst B

Support B was prepared by mixing 191 g of pseudoboehmite alumina (LOI 24%) was mixed with sufficient dilute $HNO_3$ to peptise part of the alumina and mixed for 15 minutes, after which 140 g of the synthetic saponite prepared above and 37.1 g of $MoO_3$ (Climax) were added to the mixture. Some additional water was added, and the resulting mixture was kneaded for 40 minutes. The paste was then extruded to form 1.5 mm cylindrical extrudates, which were dried at 120° C. overnight, and subsequently calcined in air at 450° C. for one hour. The water PV of the extrudates was 0.8 ml/gram. The PV as measured by mercury intrusion was 0.67 ml/gram, with an MPD of 13.8 nm.

216.8 g of support B (LOI 7.9%, PV $H_2O$ 0.8 ml/g) were impregnated with a solution of $Co(NO_3)_2$ in water. The catalyst was dried at 120° C. for 1.5 hours and subsequently calcined in air at 420° C. for 1 hour. The metal contents of the final catalyst were 11.5 wt % $MoO_3$ and 3.2 wt % CoO.

The pore size distribution of the final catalyst was as follows:

| Hg autopore |
|---|
| MPD = 13.7 nm |
| PV > 2.1 nm = 0.615 ml/g |
| > 5.0 nm = 0.400 ml/g |
| > 10 nm = 0.234 ml/g |
| > 20 nm = 0.128 ml/g |

EXAMPLE 8
(Mild) Hydrocracking Activity of the Catalysts According to the Invention Prepared in Example 7

The catalysts prepared in Example 7 were tested in hydrocracking. For this purpose, 100 ml of each catalyst, diluted with carborundum, were loaded in a tubular reactor fitted with a thermowell.

The catalysts were pretreated in a DMDS-spiked LGO at 30 bar. The catalysts were heated under hydrogen to 120° C., after which the DMDS spiked LGO (2.2 wt % DMDS, 3 wt % total sulphur) was introduced. The catalyst was kept at 120° C. for an additional period of 3 hours while the spiked feed was passed at an LHSV of 4. An $H_2$ flow was then started to reach an H$_2$/Oil ratio of 200 Nl/l and an LHSV of 1.5. The temperature was increased in two steps to 320° C., at which temperature the catalyst was kept for 3 hours.

The feed for the activity test was a Kuwait VGO with the following properties:

| ASTM D,-1160 | |
|---|---|
| IBP | 370° C. |
| 5% | 348° C. |
| 10% | 391° C. |
| 30% | 421° C. |
| 50% | 451° C. |
| 70% | 486° C. |
| 90% | 527° C. |
| 95% | 540° C. |
| FBP | 562° C. |
| Density (50° C.) | 0.9018 g/ml |
| Nitrogen | 881 ppm |
| Sulphur | 2.98 wt % |
| Refr. Index | 1.5061 |
| Wt % H from NMR | 13.26 |
| Aromatics | |
| Mono | 14.1 wt % |
| Di | 23.6 wt % |
| Tri+ | 4.0 wt % |
| Aniline point. | 78° C. |

The catalysts were tested under two conditions.

| | Condition 1 | Condition 2 |
|---|---|---|
| Temperature (° C.) | 395 | 395 |
| LHSV (h-1) | 2.00 | 0.50 |
| H2/Oil (Nl/l) | 320 | 320 |
| Pressure (bar) | 50 | 50 |
| Days | 2 | 3 |

The performance of the two catalysts under the conditions described above is reported below. The figures given are averaged out over several samples taken during the respective conditions.

Catalyst A

| | MHC Conv. 391- | K MHC | HDN ppm N feed | ppm N product | K HDN | HDS wt. % S feed | wt. % S product | K HDS |
|---|---|---|---|---|---|---|---|---|
| C1 | 18.9% | 0.418 | 881 | 480 | 1.20 | 2.98 | 0.190 | 7.55 |
| C2 | 39.2% | 0.248 | 881 | 177 | 0.80 | 2.98 | 0.038 | 6.11 |

Catalyst B

| | MHC Conv. 391- | K MHC | HDN ppm N feed | ppm N product | K HDN | HDS wt. % S feed | wt. % S product | K HDS |
|---|---|---|---|---|---|---|---|---|
| C1 | 19.2% | 0.426 | 881 | 454 | 1.33 | 2.98 | 0.163 | 8.51 |
| C2 | 39.6% | 0.252 | 881 | 152 | 0.88 | 2.98 | 0.030 | 7.22 |

Conversion is defined as:

$$\text{Conv. } 391-= \frac{391+(\text{feed}) - 391+(\text{product})}{391+(\text{feed})}$$

in which 391+(product) is the fraction of the product boiling above 391° C., and 391+(feed) is the fraction of the feed boiling above 391° C. K MHC is the reaction rate constant for the mild hydrocracking reaction, K HDN is the reaction rate constant for the HDN reaction, and K HDS is the reaction rate constant for the HDS reaction. These three reactions obviously occur simultaneously.

EXAMPLE 9
Isomerisation Activity of the Catalyst According to the Invention

A sample of Mg-saponite prepared as described in Example 7 was shaped by pressing tablets of the material and crushing the tablets. A fraction of particles measuring 0.4–0.6 mm was sieved out and used for the activity test. The shaped sample was calcined in air at 400° C. prior to the material being loaded with Pt. The Pt-loading was performed with competitive ion-exchange using Pt(NH$_3$)$_4$Cl$_2$.H$_2$O. The final Pt-loading was 0.35%. About 6 g of the sample were calcined in air at 650° C. for 3 hours. The sample was then reduced in a flow of 50 ml/hr of H$_2$ at 6 bar at 400° C. for two hours, after which the catalyst was cooled down under hydrogen. The reduced catalyst was tested in the gas-phase hydroisomerisation of n-heptane at 320° C., at a total pressure of 30 bar. The feed consisted of a mixture of n-heptane and methylcyclohexane at a ratio of 2 to 1 in hydrogen. The hydrogen over hydrocarbon ratio was 4, and the WHSV was 1.5. A sample of the products was taken after the catalyst had been on stream for about 2 hours. Under these conditions, 56.7 wt % of the n-heptane was converted, the isomer content in the C7-fraction of the product was 99.5%, and the fraction of hydrocracked products was 0.96 wt % (the product contained 99.04 wt % of molecules larger than C5).

What is claimed is:

1. A catalyst which comprises a hydrogenation metal component and a swelling synthetic clay composed of metal ions and elemental clay platelets, with the average diameter of the clay platelets not exceeding 1 micron and the average degree of stacking of the clay platelets not exceeding 5 platelets per stack, wherein said swelling synthetic clay is a saponite.

2. The catalyst of claim 1 wherein at least 1 atomic % of the metal ions in the clay platelets is replaced by metal ions of a lower valency than is required for neutral clay platelets.

3. The catalyst of claim 1 wherein the average diameter of the clay platelets does not exceed 0.5 micron.

4. The catalyst of claim 1 wherein the catalyst comprises a component of a Group VIB metal and/or a component of a Group VIII metal.

5. The catalyst of claim 4 wherein at least one of the hydrogenation metals is present in the octahedral layer of the clay mineral.

6. The catalyst of claim 1 which comprises at least 5 wt. % of a matrix material.

7. The catalyst of claim 1 which additionally comprises a matrix material with catalytic activity selected from silica-alumina and a molecular sieve component.

8. The catalyst of claim 6 wherein the matrix material is selected from the group consisting of alumina, silica, silica-alumina, titania, zirconia and mixtures thereof.

9. A process for the hydroprocessing if hydrocarbon feedstocks wherein the feedstock to be hydroprocessed is contacted at a temperature of 200° C. to 400° C. and a pressure of 5 to 300 bar with a catalyst according to claim 1.

10. The process of claim 9 wherein the process is a hydrocracking process.

* * * * *

UNITED STATES PATENT AND TRADEMARK OFFICE
CERTIFICATE OF CORRECTION

PATENT NO. : 6,334,947 B1
DATED : January 1, 2002
INVENTOR(S) : Mark De Boer, Eelco Titus Carel Vogt, Robertus Gerardus Leliveld, John Wilhelm Geus and Roland Jacobus Martinus Josephus Vogels It is certified that error appears in the above-identified patent and that said Letters Patent is hereby corrected as shown below:

Column 4,
Line 24, change "600" to -- 60° --.

Column 8,
Line 19, change "2300" to -- 230° --.

Column 9,
Line 19, change "a re" to -- are --.

Column 10,
Line 5, change "we re" to -- were --.

Column 11,
Line 1, change "$M_{6-x}Z_xSi_8O_{20}(OH_4)$" to -- $Mg_{6-x}Z_xSi_8O_{20}(OH_4)$ --.

Column 17,
Line 4, change "if" to -- of --.

Signed and Sealed this

Thirtieth Day of April, 2002

Attest:

JAMES E. ROGAN
*Attesting Officer*  *Director of the United States Patent and Trademark Office*